Aug. 21, 1962
L. G. BOUGHNER
3,049,928
NON-DRIVE TORQUE-TRANSMITTING AXLES FOR TRANSPORTATION VEHICLES
Filed Aug. 28, 1959
4 Sheets-Sheet 1
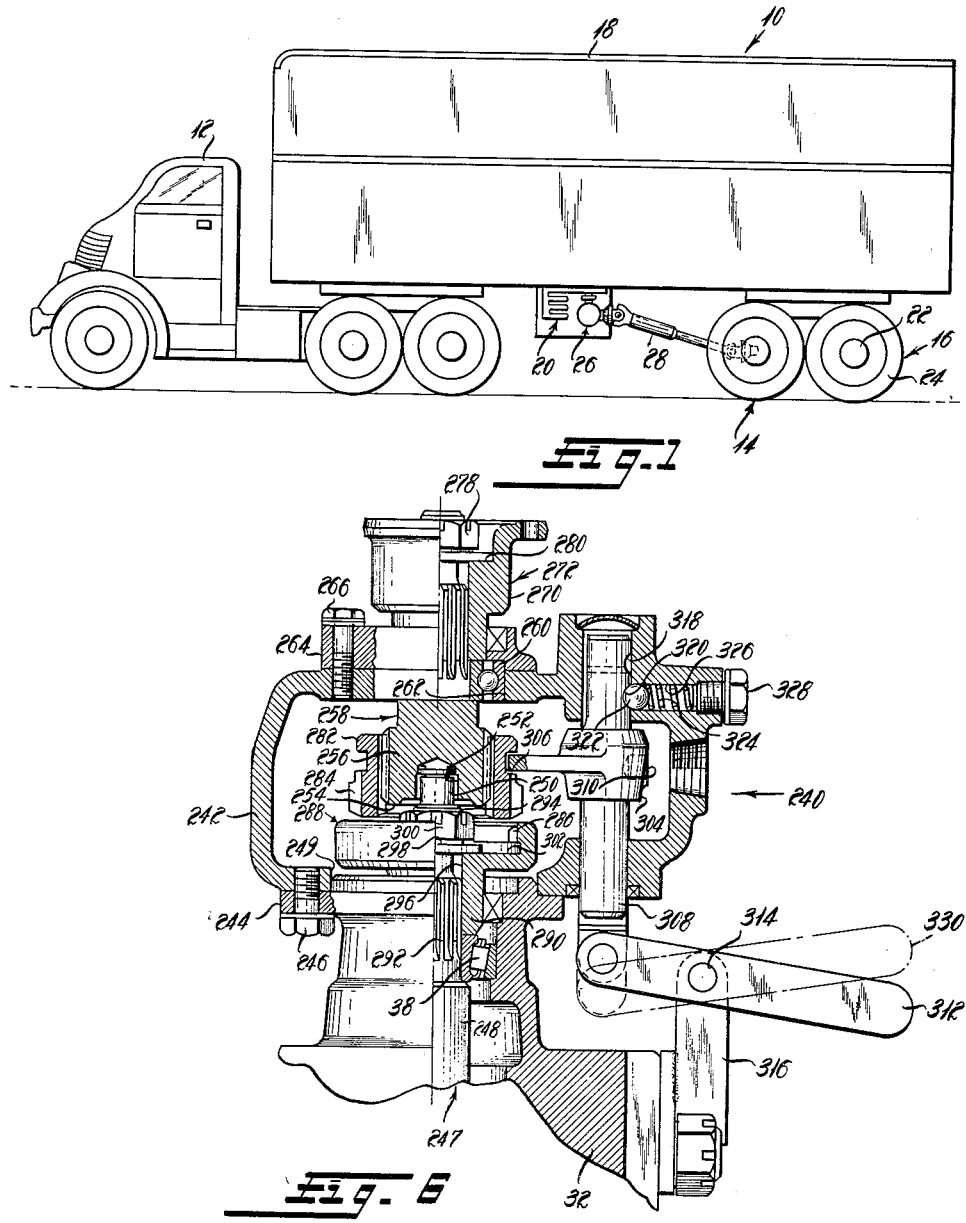
INVENTOR.
LAWRENCE G. BOUGHNER
BY
Strauch, Nolan & Neale
ATTORNEYS

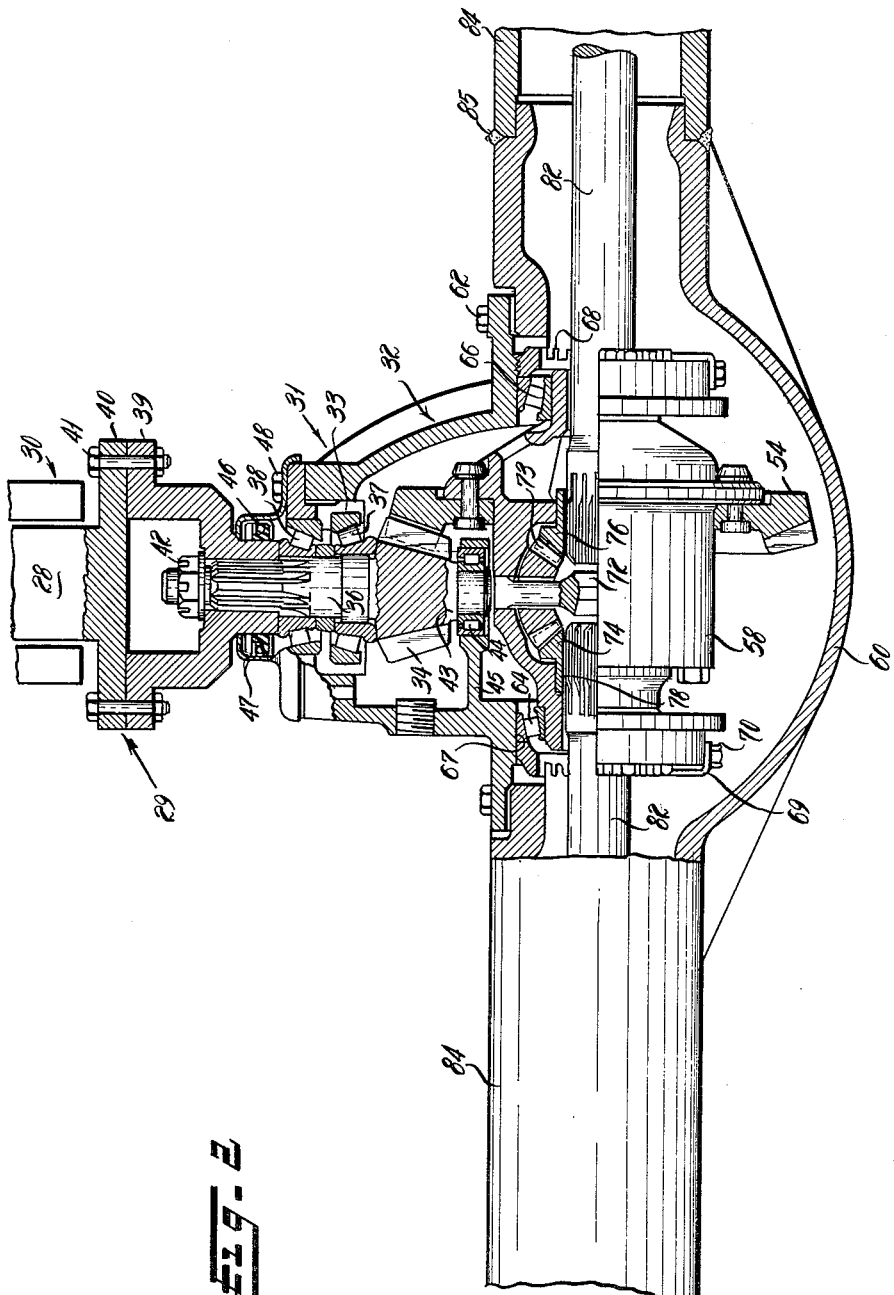

Aug. 21, 1962
L. G. BOUGHNER
NON-DRIVE TORQUE-TRANSMITTING AXLES
FOR TRANSPORTATION VEHICLES
3,049,928
Filed Aug. 28, 1959
4 Sheets-Sheet 3
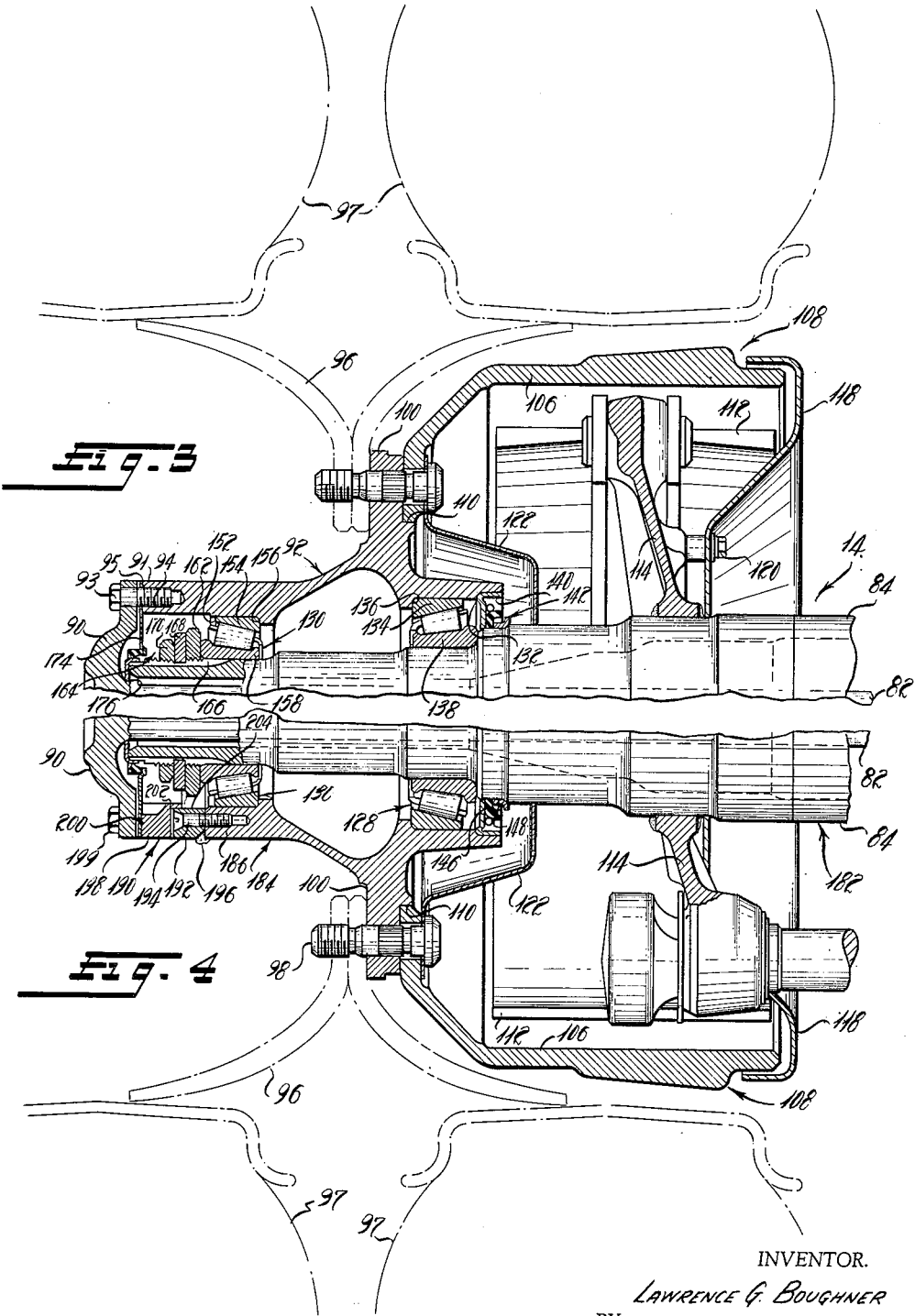
INVENTOR.
Lawrence G. Boughner
BY
Strauch, Nolan & Neale
ATTORNEYS Aug. 21, 1962 — L. G. BOUGHNER — 3,049,928
NON-DRIVE TORQUE-TRANSMITTING AXLES FOR TRANSPORTATION VEHICLES
Filed Aug. 28, 1959 — 4 Sheets-Sheet 4

INVENTOR.
LAWRENCE G. BOUGHNER
BY
ATTORNEYS

United States Patent Office 3,049,928
Patented Aug. 21, 1962

3,049,928
NON-DRIVE TORQUE-TRANSMITTING AXLES FOR TRANSPORTATION VEHICLES
Lawrence G. Boughner, Detroit, Mich., assignor to Rockwell-Standard Corporation, Coraopolis, Pa., a corporation of Pennsylvania
Filed Aug. 28, 1959, Ser. No. 836,740
8 Claims. (Cl. 74—13)

This invention relates to axle constructions for transportation vehicles and more particularly non-drive trailer axle constructions for trailers wherein torque produced by rotation of ground-engaging trailer wheels is transmitted to drive mechanical equipment positioned on the trailer.

One possible application of the present invention is in connection with refrigerated van-type trailers which are equipped with a refrigeration system having a compressor for cooling the interior of the trailer van to thereby facilitate the transportation of perishables over long distances. The present invention is concerned with the provision of power for driving the refrigeration compressor or other mechanical equipment carried on the trailer.

In the past, it has been customary to drive the refrigeration compressor by an individual auxiliary internal combustion engine usually mounted in a compartment with the refrigeration apparatus at the forward end of the trailer. Thus, during movement of the trailer over long hauls, the engine is operated to drive the compressor of the refrigeration system so as to keep the interior of the van cool and thus prevent spoilage of the perishables being transported.

It will be appreciated that in addition to the initial high expense of providing for and installing the gasoline engine power plant to operate the refrigeration system, the engine requires continual up-keep and maintenance. These auxiliary engines also add to the weight of the trailer and correspondingly decrease the carryable pay load of the trailer.

In order to eliminate the necessity for an auxiliary engine to drive the refrigeration compressor, it has been proposed to drive the compressor of the refrigeration system by power transmitted from the vehicle transmission or propeller shaft. The application of this proposal, however, to semi-trailers drawn by detachable tractor units is not practical in view of the difficulty of providing for suitable power transmitting gear trains between the two relatively movable vehicle elements.

The present invention contemplates a special non-driving torque-transmitting axle assembly supported at opposite ends by road-engaging wheels that rotate due to frictional contact with the road and which functions to transmit the torque produced by the rotation of the wheels to motor-driven apparatus, such as refrigeration compressors, carried on a vehicle which is supported by the axle assembly.

Accordingly, the present invention has as its purpose a primary object, the provision of a novel non-driving torque-transmitting axle construction supported by ground-engaging wheels for supporting a transportation vehicle and for providing power to operate mechanical equipment carried by the vehicle.

Still a further object of the present invention is to provide in a semi-trailer a novel live non-driving axle construction having an axle shaft rotated and supported by ground-engaging wheels for driving a compressor of a refrigeration unit mounted on the trailer.

A further object of the present invention resides in the provision of a novel trailer axle construction having improved hub and axle shaft flange connections to facilitate rotation of an axle shaft by the rotation of ground engaging wheels supporting the trailer.

A further object of the present invention, constituting another embodiment, resides in the provision of a special adapter assembly for converting a dead non-driving trailer axle assembly into a live non-driving trailer axle assembly by extending the axial length of a standard non-drive axle wheel hub to facilitate the mounting of a conventional axle shaft in the axle housing of the trailer to provide for a drive connection between the hub and the shaft so that the latter is driven by the ground engaging wheels of the trailer to thereby serve as a power source for operating mechanical equipment carried on the trailer.

Still a further object of the present invention is to provide in a transportation vehicle having at least one non-driving axle assembly supported at opposite ends by road-engaging wheels, a novel axle shaft construction supported in the axle assembly and including axle shafts connected at their outer ends to the wheels and at their inner ends to a differential gear mechanism wherein the differential gear mechanism has an output drive connection for driving mechanical equipment on the vehicle.

Still a further object of the present invention resides in the provision of the axle assembly as in the preceding object wherein a clutch mechanism is provided in the drive connection between the differential output and the mechanical equipment for selectively establishing transmission of torque to operate the equipment.

A further object of the present invention is to provide a novel drive mechanism for operating the refrigeration system of a refrigerated van-type trailer which reduces the weight of equipment carried by the trailer to thereby facilitate the transportation of heavier pay-loads.

Further objects of the present invention will presently appear as the description proceeds in connection with the appended claims and the annexed drawings, wherein:

FIGURE 1 is a side elevational view of a semi-trailer and tractor unit embodying the principles of the present invention.

FIGURE 2 is an enlarged fragmentary partially sectioned top-view illustrating the central axle bowl portion of one of the rear axle assemblies of the semi-trailer of FIGURE 1.

FIGURE 3 is an enlarged fragmentary partially sectioned side elevational view illustrating the outer wheel-hub end of the rear axle assembly of FIGURE 2.

FIGURE 4 is an enlarged fragmentary partially sectioned side elevational view similar to FIGURE 3 and illustrating the outer end of an axle assembly in accordance with a further embodiment of the present invention.

FIGURE 6 is an enlarged fragmentary partially sectioned view illustrating another drive connection for the axle assembly of FIGURE 1 and constituting a further embodiment of this aspect of the invention.

Figure 5:
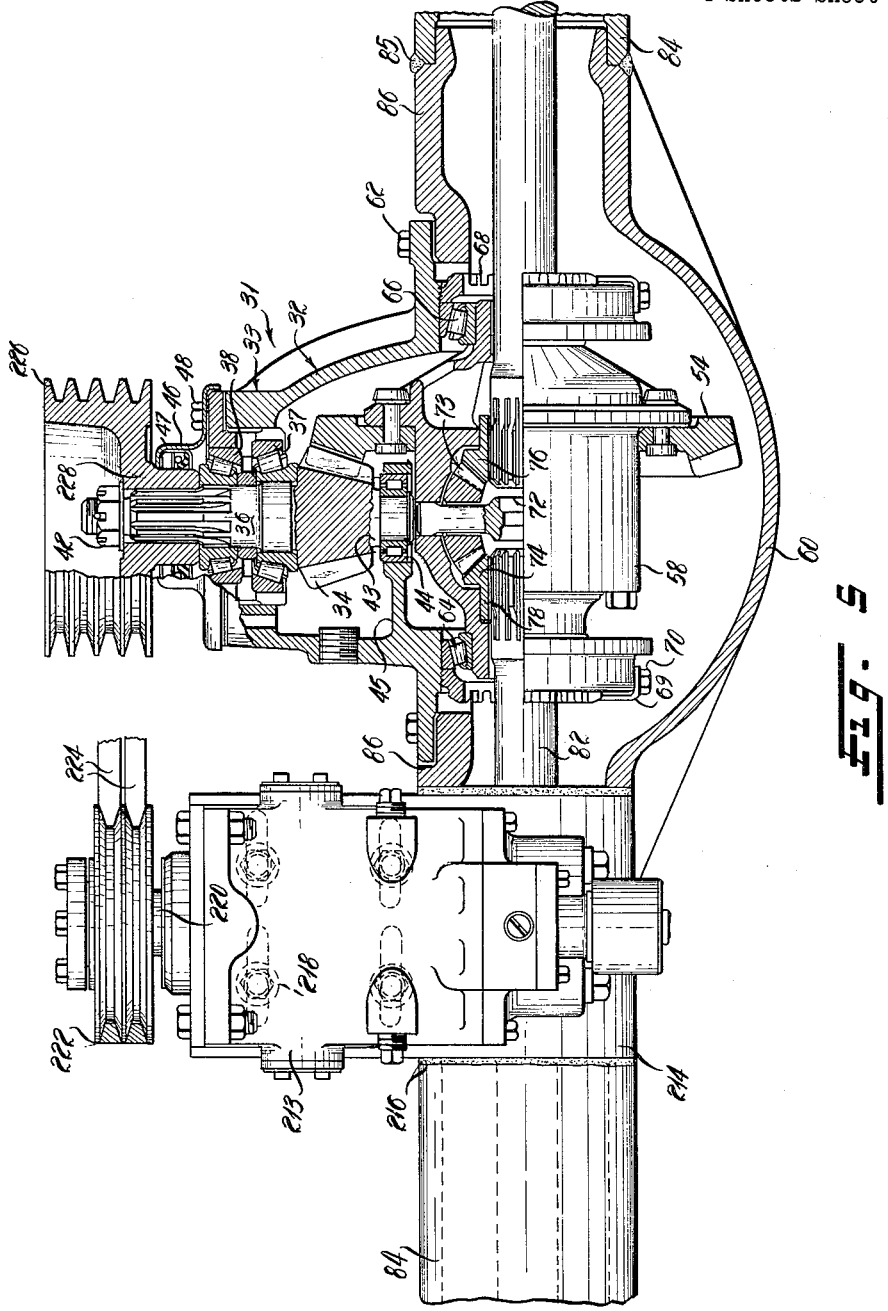
FIGURE 5 is an enlarged fragmentary partially sectioned top view similar to FIGURE 2 and illustrating the central axle bowl portion of an axle assembly in accordance with a still further embodiment of the present invention.

Referring now to the drawings and more particularly to FIGURE 1, wherein the construction embodying the principles of the present invention are shown, the reference numeral 10 generally designates a conventional van-type semi-trailer adapted to be drawn by a detachable tractor unit 12 and having a non-drive forward rear axle unit 14 and a non-drive rearward rear axle unit 16. The trailer 10 is provided with a standard enclosed body 18, the interior of which is cooled to a selected temperature by a conventional refrigeration unit generally indicated at 20 so as to facilitate the transportation of perishables over long distances.

3

The rearward non-drive axle unit 16 is a conventional non-drive unit and includes an axle beam 22 supported at its opposite ends by ground-engaging wheels indicated at 24.

Referring now to FIGURES 1 and 2, the refrigeration unit 20 comprises a conventional refrigeration compressor 26 which is drive-connected, in accordance with the present invention, to one end of a universally connected propeller shaft 28 having a conventional telescoping extensible connection. At its opposite axle end, the propeller shaft 28 is connected to a coupling flange assembly 29 to the rear of its universal joint 30. The coupling flange 29 provides a drive connection between the propeller shaft 28 and a differential drive mechanism 31 which comprises a differential gear carrier housing 32 having a forward or nose bearing cage section 33. Cage 33 rotatably mounts an output bevel or hypoid pinion 34 and integral shaft 36 on axially spaced tapered-roller type anti-friction bearings 37 and 38 supported and confined against axial movement in cage 33. To the outer end of pinion shaft 36 is splined a coupling flange 39 of flange assembly 29 which is fixedly secured to a propeller shaft end mating flange 40 as by bolts 41. The coupling flange 39 is retained on pinion shaft 36 by nut 42 which threadedly engages the end of pinion shaft 36.

At its opposite differential gear end, the pinion is provided with an integral piloting stub shaft 43 projecting from the planar end face of the pinion and journalled in a roller bearing 44, the outer race of which is fitted into an aperture formed in a partition 45 of carrier 32.

A seal 46 is mounted in surrounding relation to the hub section of coupling flange 39 and is protected from foreign matter by a baffle plate 47 fixedly secured to carrier 32 as by machine screws 48.

A bevel ring gear 54 in constant mesh with pinion 34 so that the gears are operating on the drive side of the teeth, is mounted for rotation with a cylindrical differential case 58 in a cast axle housing bowl 60 which is affixed to the carrier 40 by bolts indicated at 62. The differential case 58 is rotatably mounted at opposed ends by spaced tapered-roller type anti-friction bearings 64 and 66 which are mounted in bores 67 of carrier 32 and retained therein by nuts 68 held in retaining position by locks 69 fixedly secured to the carrier 32 as by screws 70.

A spider 72 fixedly secured to the differential case 58 rotatably mounts spaced differential bevel pinions 73 which are in constant mesh with opposed differential bevel input side gears 74 and 76. These side gears 74 and 76 are journalled in case 58 and are splined to the inner ends of coaxially spaced axle shafts 82 which serve to transmit driving torque from the ground-engaging wheels to the side gears.

Each axle shaft 82 extends coaxially through a tubular axle housing 84 which is welded at 85 or otherwise suitably secured to the side arm 86 of the axle bowl 60 in surrounding concentric spaced relation to shaft 82.

Referring now to FIGURE 3, the outer end of each shaft 82 terminates in a laterally extending annular flange 90 which is fixedly secured to a specially extended cylindrical integral end section 91 of wheel hub 92 by capscrews 93 which engage internally threaded bores 94 extending inwardly from the planar end face 95 of the hub end section 91. The planar end face 95 of the specially extending integral cylindrical end section terminates in a vertical plane that is in close proximity to and immediately adjacent the outer end of the axle housing 84 so that the flange 90 radially bears against the end face 95 in assembled relationship.

Wheel discs 96 having ground-engaging tires indicated at 97 are mounted by wheel studs 98 on a flanged portion 100 of the wheel hub 92.

A brake drum 106 of brake drum assembly 108 is supported on an annular shoulder 110 formed by the wheel hub flange-portion 100 and is abuttingly secured to the wheel hub 92 by the wheel studs 98. The brake drum 106 houses a standard brake assembly 112 which is supported by brake spider 114 coaxially affixed to the axle housing 84 by welding or other suitable means. In order to protect the brake assembly 112 from road dust and dirt, a rear dust shield 118 encloses the inward end of brake drum 106 and is secured to the brake spider 114 by capscrews 120. Enclosing the outward end of brake drum 106 is another dust shield 122 having a frusto-conical configuration and secured by the wheel studs 98 to the drum 106.

Opposed tapered roller-type anti-friction bearings 128 and 130 journal the wheel hub 92 on the axle housing 84. Bearing 128 is received in end bore 132 of hub 92 with its outer race 134 in abutment with shoulder 136 and has its inner race 138 press-fitted onto a seat formed on the surface of axle housing 84. A retainer 140 of a protective seal assembly 142 is press-fitted into the opening 132 of wheel hub 92 and an oil seal 146 which is retained thereby and which is in annular contact with surface 148 of axle housing 84, effectively precludes loss of lubricant from the wheel hub 92 into the brake assembly 112, thereby preventing contamination of the latter assembly.

Bearing 130 is received in an opposite end bore 152 of the wheel hub 92 with its outer race 154 in abutment with shoulder 156 and its inner race 158 press-fitted on a seat formed on the surface of axle housing 84. Radially abutting the inner race 158 of bearing 130 to adjustably restrain the bearing 130 against axial movement, is a nut 162 of a bearing adjusting assembly 164 which engages a threaded section 166 of the axle housing 84. The nut 162 is secured against axial movement by a ring 168 which has an integral tongue or key seated in axial peripheral groove or keyway formed in the axle housing 84 and a lock nut 170 which axially abuts the ring 168 and retains the assembly 164 in its axially adjusted position.

A shim and seal assembly 174 mounted in the opening defined by bore 152 of wheel hub 92 is in annular sealing contact with surface 176 of axle housing 84 to limit the loss of lubricant and to prevent lubricant from entering the space between the axle housing 84 and the axle shaft 82.

By this structure, it will be appreciated that rotation of the ground engaging wheels 97 as the trailer 10 is drawn by its tractor unit 12 rotates the wheel hub 92 and the axle shaft 82 about the axle housing 84. This torque established by the rotation of the ground-engaging wheels 97 is thereby transmitted to input side gears 74 and 76 to rotate the differential case 58 and ring gear 54 to drive the output pinion 34 and propeller shaft 28 which is drive connected to the refrigeration compressor 26 of the refrigeration unit 20. Thus the operation of the refrigeration unit 20 is maintained during vehicle movement to cool the interior of the trailer 10.

Referring now to FIGURE 4, the axle unit 182 illustrated therein is identical with that shown in FIGURE 3 and described in connection therewith except that a conventional non-drive wheel hub 184 having a cylindrical end section 186 of standard axial length is provided for. This standard end section 186 is substantially of shorter axial length as compared to the special cylindrical hub wheel end section 91 described in connection with the embodiment of FIGURE 3 and terminates in a planar end face a substantial predetermined axial distance inwardly of the outer end of housing 84. Thus, it will be appreciated that the wheel hub end section 186 is not long enough to mount a conventional axle shaft of the type shown in FIGURE 3.

In accordance with the present invention, an adapter assembly 190 is provided to increase the axial length of the standard wheel hub end section 186 to facilitate the mounting of axle shaft 82 and to thereby accomplish a ready and inexpensive conversion of a standard dead non-drive axle unit into a live torque-transmitting axle assembly.

This adapter assembly 190 includes an annular adapter ring 192 with the same inner and outer diameters as the cylindrical wheel hub end section 186 which is coaxially mounted in abutting relationship with the exposed planar end face of the wheel hub end section 186 by sunk flat head screws indicated at 194 and by welds indicated at 196. Between the axle shaft flange 90 of axle shaft 82 and the annular adapter 192, a spacer ring 198 is coaxially rigidly mounted as by peripherally spaced machine screws 199 which extend through aligned bores in the spacer ring and engage internally threaded bores extending inwardly from the planar end face 200 of the adapter 192. The spacer ring is provided with a skirt 202 which slidably engages the internal annular surface 204 of the adapter 192 with a piloting fit to prevent misalignment between the wheel hub 184 and the axle shaft 82. The outer diameters of the spacer ring 198 and the adapter 192 are the same as the outer diameter of the wheel hub end section 186 so as to provide a substantial continuous smooth cylindrical surface.

Thus by this special structure, it will be appreciated that the adapter assembly 190 functions to extend the axial length of the standard non-drive wheel hub 184 so that it is equal to the axial length of the special hub 92 described in connection with the embodiment of FIGURE 3. Shaft 82 thereby is drivingly secured to the hub 184 by screws 199 with flange 90 in radially bearing relation to outer end face of spacer ring 198.

In the embodiment illustrated in FIGURE 5, the refrigeration compressor 213 is belt driven and is mounted on a base plate 214 which is suitably welded to the axle housing 84 as indicated at 216. Bolt and nut assemblies indicated at 218 secure the base of compressor 213 to the plate 214 and extend through elongated apertures in the base plate 214 provide for lateral belt-adjusting movement of the compressor 213.

The compressor 213 is provided with a shaft 220 upon which a multiple grooved pulley 222 is fixedly secured by any suitable means. This compressor pulley 222 is drive connected by belts 224 to a multiple groove drive pulley 226 having an internally splined hub section 228 which is non-rotatably affixed to splined shank section 36 of pinion 38. Pulley 226 is restrained against axial movement between the inner races of bearings 37 and lock nut 42 threadedly engaged with the pinion shaft 36. The refrigeration compressor 213 of the refrigeration system 20 is connected by a conventional refrigerant fluid circuit (not shown) to the evaporator (not shown) enclosed in the body 18 of trailer 10.

Referring now to FIGURE 6 wherein a further construction embodying the principles of the present invention is illustrated, a clutch assembly 240 is provided for in the drive connection between the differential drive mechanism 31 and the refrigeration compressor 26 for selectively establishing transmission of power from the ground-engaging wheels 97 of trailer 10 to the compressor 26. This clutch assembly comprises a housing 242 affixed to an annular flanged portion 244 of carrier 32 by screws 246. An output bevel or hypoid pinion 247 in constant mesh with ring gear 54 of the differential drive 31 and having an integral shaft 248 is rotatably mounted in the carrier cage 33 as hereinbefore described. The pinion shaft 248 extends coaxially through annular flanged portion 244 and an aperture 249 formed in the housing 242 and is provided with a coaxial terminal piloting protrusion 250 which is received with a piloting fit in a bore 252 extending coaxially inwardly of the planar end face 254 of an enlarged externally splined head section 256 of stub shaft 258.

The stub shaft 258 is journalled coaxially with pinion 247 in a ball bearing assembly 260 having its outer race press-fitted in an aperture 262 formed in the forward portion of the housing 242. This stub shaft 258 extends beyond the housing 242 and through a seal and bearing cover 264 secured to housing 242 by screws 266 and is splined to the hub section 270 of a propeller shaft connecting coupling or flange 272. Flange 272 is retained on stub shaft 258 by nut 278 which threadedly engages the terminal end section of shaft 258 extending beyond housing 242. The flange 272 is thereby confined against axial movement between the nut 278 and the inner race of bearing 260 which axially abuts the planer end face of the flange hub section 270.

In order to establish a drive connection between stub shaft 258 and pinion 247, an internally splined clutch collar 282 is mounted for longitudinal sliding movement along the splined portion 256 of shaft 258. Collar 282 is provided at its pinion end with an exterior annular row of clutch teeth 284 which mesh with the annular internal teeth 286 of a ring gear 288 when the clutch collar 282 is shifted to a drive position. The ring gear 288 is provided with an internally splined hub 290 which is drivingly splined to the pinion shaft 248.

The shaft 248 of pinion 247 is provided with a threaded section 294 adjacent the pilot 250 and which extends through the bore 296 of the ring gear hub section 290 and through a washer 298 and threadedly receives a tightening nut 300. Tightening nut 300, in assembled relationship, urges the washer 298 into radial abutment with an annular recessed shoulder 302 formed integral with the ring gear 288 to restrain the ring gear 288 against axial movement between the washer 298 and the inner race of the pinion shaft bearing 38.

In order to axially shift the clutch collar 282 into and out of engagement with ring gear 288, an axially movable shift fork 304 is provided and extends into a central annular peripheral groove 306 of collar 282. This shift fork 304 is shifted axially by a shift rail 308 and is fixedly secured thereto as by a set screw indicated at 310. The shift rail 308 is supported in the clutch housing 242 for axial sliding movement and has one end extending beyond the housing 242 and pivotally connected to a lever 312. The lever 312 is rotatable about a fixed pivot 314 on a plate 316 welded to the carrier 32.

The upper end of shift rail 308 as viewed from FIGURE 6 is formed with two axially spaced semi-circular notches 318 and 320 for respectively locking the shift rail 308 in engaged and disengaged positions. These notches 318 and 320 provide seats for a ball 322 which is biased against the periphery of the shift rail 308 by a spring 324 aligned in a bore 326 formed in housing 242 and extending transversely of the axis of the shift rail 308. This spring 324 engages at one end with the ball 322 and at the other end with a cap 328 threadedly engaging a threaded section of bore 326.

By this construction, it will be appreciated that selective movement of the lever 312 to its dotted line position 330 shifts the rail 308 axially downwardly as viewed from FIGURE 6. The locking ball 322 is displaced from the notch 320 against the bias of spring 324 and rides up on the periphery of the rail 308. The shift fork 304 and the clutch collar 282 are axially shifted downwardly until the clutch collar teeth 284 drivingly engage the teeth 286 of ring gear 288. In this drive engaging position, the notch 318 is aligned with the axis of bore 326 so that the bias of spring 324 forces the ball 322 into the notch 318 to secure the shift rail 308 against axial movement. The internal splines of clutch collar 282 are long enough so that irrespective of the axial position of the collar 282, they are in engagement with the external peripheral splines of the enlarged stub shaft end section 256.

Thus, it will be appreciated that the road engaging wheels being drive connected to the refrigeration compressor 26 through the wheel hub 92, the axle shaft 82, the differential gear mechanism, the pinion 247, the clutch 240, and the propeller shaft 28, transmit a driving torque to the compressor when rotated by movement along the road.

While the shifting of the clutch collar 282 is described and illustrated to be a manually operated mechanical movement, it will be appreciated that the shifting operation may alternately be accomplished by electrical, hydraulic, or other means.

The present invention provides an inexpensive and weight saving drive for operating the compressor of a refrigeration unit carried on a semi-trailer unit so as to facilitate the transportation of perishables over long distances.

It will be understood, however, that the live axle drive may be applied to operate other mechanical equipment such as pumps or agitators to circulate air through a tank-body trailer hauling live fish.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a transportation vehicle, driven means mounted on said vehicle, and at least one non-driving torque-transmitting axle assembly supported at opposite ends by road-engaging wheels that rotate due to frictional contact with the ground for supporting said vehicle and driving said driven means, said axle assembly comprising a tubular axle housing, at least one non-driving wheel hub affixed to at least one of said wheels and rotatably mounted on said axle housing, said hub having an outwardly extending tubular section surrounding said housing in concentric spaced relation to said housing and terminating a predetermined axial distance inwardly of the adjacent outer end of said housing, a rotatably mounted shaft extending through said housing and terminating in a laterally extending flange member protruding beyond said housing in axially spaced relation to the end of said tubular section, means for drivingly connecting the inner end of said shaft to said driven means, and an adapter assembly for drivingly interconnecting said flange member and said hub for transmitting torque established by rotation of said wheels to said driven means.

2. The transportation vehicle as defined in claim 1 wherein said adapter assembly comprises a plurality of annular members rigid with said flange member and said hub and coaxially mounted between said flange member and said tubular section, said annular members having an aggregate axial length substantially equal to the space between said flange member and the outer end of said tubular section so that the exposed end faces thereof are in bearing relation to said hub and said flange member.

3. The transportation vehicle as defined in claim 1 wherein said adapter assembly comprises an annular adapter member coaxially secured to said tubular section in abutting relation to the end face thereof and an annular spacer mounted between and radially abutting with said flange member and said adapter member, said annular adapter member and said annular spacer having outer diameters substantially equal to said tubular section for providing a substantially smooth axial extension of said tubular section.

4. The transportation vehicle as defined in claim 3 wherein said annular spacer is provided with a skirt portion slidably engaging the inner surface of said adapter member with a piloting fit for preventing misalignment between said hub and said axle shaft.

5. In a non-driving axle assembly for a vehicle, a relatively stationary transverse hollow tubular housing adapted to be non-rotatably mounted beneath the vehicle, ground engaging wheels rotatably mounted on bearings on opposite ends of said housing to support said housing, said housing having an enlarged center section, differential mechanism in said center section and shafts extending through said housing from opposite input sides of said differential mechanism into operative connection with said wheels so that said shafts are rotated by the wheels, a rotatable power output shaft projecting from said differential mechanism through the housing, and means on said output shaft outside the housing for coupling said output shaft to drive an accessory on said vehicle.

6. In the assembly defined in claim 5, means mounting at least a part of said accessory on said housing, and drive transmitting means between said output shaft and the accessory part.

7. In the assembly defined in claim 5, said means on the output shaft outside the housing comprising a housing extension, a coupling shaft rotatably mounted in said housing extension, a clutch for operably connecting and disconnecting said output and coupling shafts, and a clutch operator on said housing extension.

8. In a transportation vehicle having an accessory to be driven mounted thereon, a non-driving torque-transmitting axle assembly extending transversely beneath the vehicle and supported at opposite ends by ground engaging wheels that rotate due to frictional contact with the road, said axle assembly comprising a non-rotatable tubular axle housing, wheel hubs for said wheels mounted in surrounding relation over each end of the axle housing and journaled on said housing, a differential mechanism within said housing having an output shaft for connection to said accessory and having oppositely extending input shafts projecting through the ends of said housing, and means drive connecting the axially outer ends of the associated input shafts and hubs.

References Cited in the file of this patent

UNITED STATES PATENTS

| | | |
|---|---|---|
| 1,069,840 | Adams | Aug. 12, 1913 |
| 1,827,981 | Gates | Oct. 20, 1931 |
| 1,975,351 | Day | Oct. 2, 1934 |
| 2,026,076 | Spicer | Dec. 31, 1935 |
| 2,036,247 | Winther | Apr. 7, 1936 |
| 2,084,259 | Pitt | June 15, 1937 |
| 2,097,857 | Ferris et al. | Nov. 2, 1937 |
| 2,262,375 | Smith | Nov. 11, 1941 |
| 2,533,022 | Kuhl | Dec. 5, 1950 |
| 2,533,759 | Bobard | Dec. 12, 1950 |
| 2,570,191 | Beckwith | Oct 9, 1951 |
| 2,620,636 | Stanton | Dec. 9, 1952 |
| 2,735,501 | Lloyd | Feb. 21, 1956 |